Patented Apr. 10, 1923.

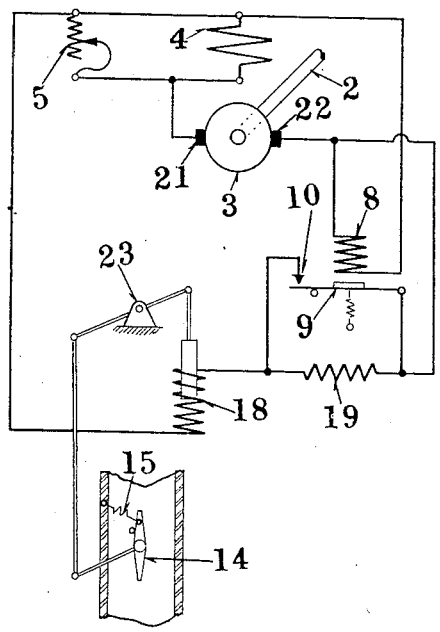
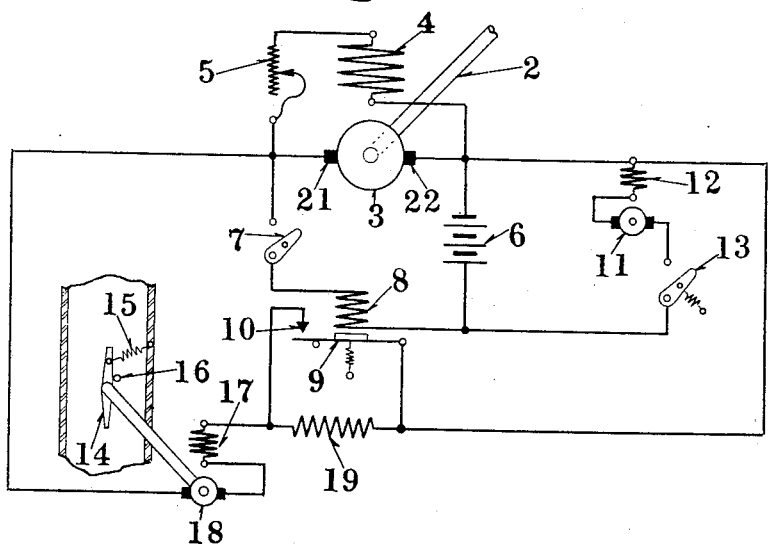

1,451,501

UNITED STATES PATENT OFFICE.

VALÈRE A. FYNN, OF ST. LOUIS, MISSOURI, ASSIGNOR, BY MESNE ASSIGNMENTS, TO WAGNER ELECTRIC CORPORATION, OF ST. LOUIS, MISSOURI, A CORPORATION OF DELAWARE.

SPEED-REGULATING APPARATUS.

Application filed July 5, 1919. Serial No. 308,867.

*To all whom it may concern:*

Be it known that I, VALÈRE A. FYNN, a subject of the King of England, residing at the city of St. Louis, State of Missouri, United States of America, have invented a certain new and useful Speed-Regulating Apparatus, of which the following is such a full, clear, and exact description as will enable any one skilled in the art to which it appertains to make and use the same, reference being had to the accompanying drawings forming part of this specification.

My invention relates to means for controlling the speed of prime movers, as for instance of internal combustion engines. My object is to provide a system which will permit of ready adjustment of the speed of the prime mover over a wide range and make it possible to hold the selected speed within the close limits within the whole regulating range and regardless of the changes in the load on the prime mover.

In carrying out my invention, I make use of electromagnetic means for controlling the supply of energy or fuel to the prime mover and I cause the amount of energy supplied to the electromagnetic controlling device to vary in dependence on the speed of the prime mover, or more specifically in dependence on the terminal voltage or on the current or on the watts produced or absorbed by a dynamo electric machine geared to the prime mover. In the embodiments herein described, I cause the resistance of the controller circuit to vary in dependence on the current or voltage variations in the circuit of a dynamo electric machine driven by the prime mover. In one modification, in order to secure greater sensitiveness, I put the resistance of the controlling device under the control of a current due to the difference of two E. M. F.'s, one of which is independent of the prime mover, while the other depends on the speed of the latter. In all cases, I prefer to influence the resistance of the controlling circuit by shunting or shortcircuiting with greater or less frequency, a resistance located in said circuit.

Figure 3:
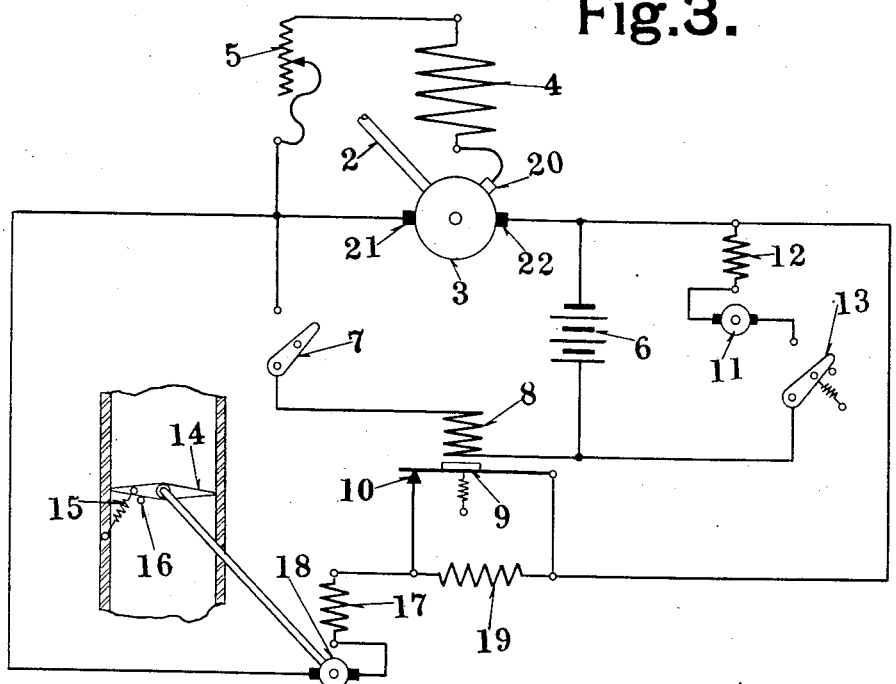
Figure 4:
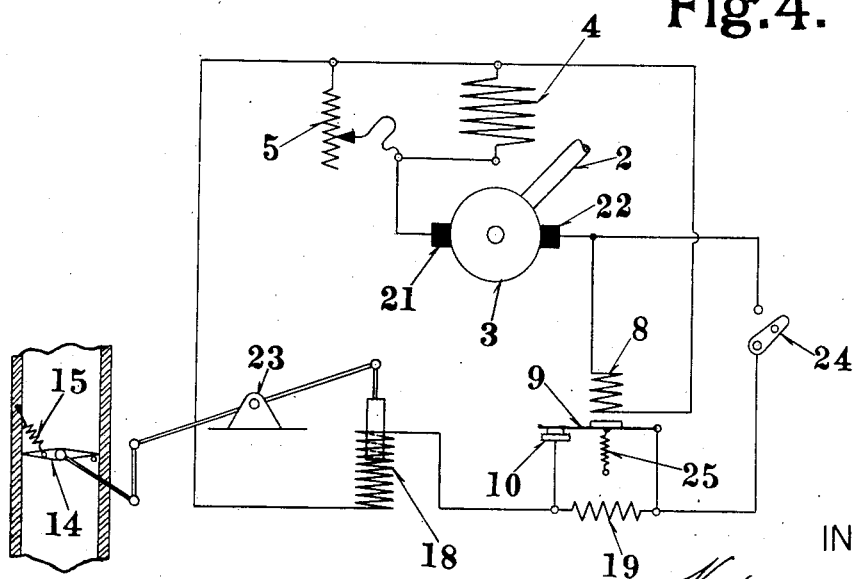

My invention will be better understood by reference to the accompanying drawings in which Figs. 1 and 4 show an arrangement in which the resistance of the controller circuit is changed by means of a vibratory relay in circuit with a series dynamo driven by the prime mover, while Figs. 2 and 3 show arrangements in which the vibratory relay is under the control of the current passing between a shunt generator driven by the prime mover and a storage battery connected in circuit with said generator.

Referring to Fig. 1, 3 is the armature of a series generator provided with the brushes 21, 22 and mounted on the shaft 2 geared to the prime mover, which in this case is supposed to be an internal combustion engine. The field winding 4 of this generator can be regulated by means of the adjustable resistance 5 connected in shunt therewith. In circuit with this generator is the coil 8 of the relay. This relay is normally open and has a spring controlled armature 9 which cooperates with the stationary contact 10 to shortcircuit the resistance 19, which is included in the circuit of the electromagnet device which controls the throttle valve of the engine. This last mentioned device comprises a solenoid 18 connected with the throttle valve 14 by means of suitable levers pivoted at 23. The valve is normally held open by means of the spring 15. The electromagnetic controlling device or controller can be connected to any source of E. M. F., for instance, to the generator 3, 4 as shown.

The operation of the apparatus described is as follows: Assuming for the moment that the E. M. F. impressed on the controller circuit is constant, then the resistance 19 and the solenoid winding 18 are so proportioned that the solenoid will just balance the spring 15 when connected to the selected source of E. M. F. The resistance 19 and the solenoid 18 are further so proportioned that when the resistance 19 is shortcircuited the solenoid 18 is excited to an extent which will enable it to close the throttle valve 14 entirely and have if desired quite a number of ampere turns in excess of the number required for this purpose. After the engine has been started in any desired or convenient manner and is running under its own power, the generator 3, 4 will quickly excite and send a current through the relay winding 8. If this relay is set to close the shortcircuit around the resistance 19, then as soon as the generator speed has reached a value at which say five amperes flow through the winding 8, the resistance of the controller circuit will be diminished by the exclusion of the resistance 19 and the throttle valve will begin to close under the action of the solenoid 18. This closing of the throttle valve will result in a reduction of the engine speed, and consequently in a reduction of the current through the relay winding 8. As soon as this current has dropped to say four amperes, the spring will take control of the relay armature 9 and interrupt the shortcircuit around 19, thus reducing the current through 18 and tending to open the throttle valve and therefore tending to increase the speed. This cycle will be repeated more or less frequently according to the load on the engine. If the load is light and it is necessary to nearly close the throttle valve 14 in order to keep the engine to the selected speed, then the shortcircuit around the resistance 19 will be closed most of the time and the armature 9 will vibrate fast. If the load on the engine is heavy and the throttle valve is to be nearly wide open, then the resistance 19 will be shortcircuited during a small percentage of the time and the armature 9 will vibrate slowly. In case the engine is fully loaded or even overloaded, the armature 9 will be in its open position and at rest only coming into action in case the load on the engine is reduced. The speed at which the critical current is reached in the coil 8 is determined by the setting of the adjustable resistance 5. The lowest speed will be secured when the exciting winding 4 is not shunted. The smaller the resistance in parallel with 4, the higher the engine speed towards which this apparatus will regulate.

The foregoing explanation was given on the assumption that the controller circuit was connected to a source of constant E. M. F. but in Fig. 1 this circuit is connected to the terminals of the generator 3, 4 itself and the E. M. F. at these terminals increases with speed. Under these conditions, some amount of regulation would be secured even if the relay 8 were not used because the increasing terminal voltage of the generator increases the magnetization produced by the solenoid 18 and therefore tends to close the throttle valve and to limit the engine speed. By connecting the controller circuit in the manner shown in Fig. 1, the sensitiveness of the regulating device is increased. The sensitiveness of the relay 8, 9 and therefore the sensitiveness of the regulating device as a whole can be increased by so connecting the spring controlling the armature 9 that there is little difference between the pull it exerts with the armature closed as compared to that it exerts when the armature is open. The break between the moving armature and the stationary contact should be such to obviate destructive sparking. This can further be reduced by making use of a low voltage generator, 3, 4. A machine generating from six to eight volts would answer the purpose very well and in that case the voltage across the relay contacts would hardly exceed four or five volts.

The arrangement shown in Fig. 4 differs in that the throttle valve controlled by the electro-magnetic speed controlling device 18 is normally held closed by the spring 15 and that the regulating resistance 19 in circuit with 18 is normally shortcircuited by the relay 8, 9. The windings and resistance 19 are so proportioned that with the relay 8, 9, open, the torque exerted by the electromagnetic device 18 just about balances the spring 15 and the valve 14 is sufficiently open to allow the engine to idle. But when relay 8, 9 is closed and 19 is shortcircuited, the torque produced by 18 keeps the valve 14 wide open. Intermediate positions of the valve result when 19 is shunted or shortcuited at more or less frequent intervals.

When the electromagnetic device is inoperative for one reason or another, the throttle valve is closed and herein lies a marked advantage of this embodiment of my invention for the engine is automatically safeguarded in case the electromagnetic speed controller or the generator actuating same are damaged and the device as a whole loses control of the throttle.

At starting, the fact that the throttle is normally closed, automatically chokes the engine which condition can be utilized to help the starting operation in a manner well understood by those skilled in the art.

As the engine speeds up and the generator 3, 4 builds up, the throttle valve opens under the influence of the current flowing through 18. At that time, 19 is shortcircuited. But as the current in 8 increases with speed, so does the upward pull on 9, opposing the spring pull exerted on this armature, increase until the shunt around 19 is interrupted at 10. But an increase in the resistance of the circuit comprising 18 tends to give the throttle into the control of spring 15 and to close it, thus limiting the speed of the engine. It is well to note that the change in the resistance of the circuit 18 is here brought about very gradually. As long as the spring 25 is in full control the contact resistance at 10 is low because of a strong pressure on that contact exerted by 25 and the resistance 19 may be said to be short circuited. As the current in 8 rises, the spring 25 is gradually overpowered, the pressure on contact 10 decreases, the contact resistances increases and 19 is now merely shunted, or at least not as fully shortcircuited as before. A further increase in current through 8 actually causes a break at 10. Because each change in the shunt around 19 reacts on the speed and reduces or increases the cause which brought about the change, viz., the current through 8, the movement of the armature 9 is seldom continuous, but mostly vibratory. This armature vibrates even long before the circuit at 10 is actually broken and continues to vibrate long after that stage, making and breaking contact at 10 at more or less frequent intervals. In this manner, it is possible to encompass a full movement of the throttle, from fully closed to wide open, or vice versa, with a very small change of current in 8 and consequently with a very small change in speed of the generator 3, 4. This means that a very close engine speed regulation can be secured over wide range of speeds without the use of a battery.

Instead of the series generator shown in Figs. 1 or 4, a shunt machine as shown in Fig. 2 could be used but the voltage of a shunt machine does not rise as quickly with speed as that of a series generator and for this reason the latter is preferable. A compound generator of ordinary construction, or of the Sayers type as shown in Fig. 3 can also be used to advantage because the voltage in such a machine rises very rapidly with increasing load and speed.

Referring to Fig. 2 the arrangement differs from that shown in Fig. 1 in that the engine driven generator is of the shunt type with an adjustable resistance 5 in the shunt circuit and is connected in series circuit with the battery 6 and the vibrator or relay coil 8, which circuit is under the control of the switch 7. In normal operation, this battery opposes the E. M. F. generated by the armature 3 and the difference in the terminal E. M. F.'s of the armature and the battery determines the current through the circuit including the relay coil 8. In Fig. 2, the generator voltage is, in normal operation, supposed to exceed that of the battery voltage. The battery is used for cranking motor 11, 12 controlled by the starting switch 13. The controller connected to the throttle valve 14 is here shown in the form of a series motor 17, 18. This controller is connected to the main brushes 21, 22 of the engine driven generator through the resistance 19 which is shortcircuited when the spring controlled armature 9 is moved out of its normal position by means of the coil 8 into contact with the stationary terminal 10.

The operation of Fig. 2 is substantially the same as that of Fig. 1 but the change of current through the vibratory coil 8 is usually greater for a given change in speed of the internal combustion engine, for the reason that this change depends on the difference of two E. M. F.'s acting upon the circuit of high conductivity instead of being dependent on the change of a single E. M. F., in the circuit comprising the relay coil. The speed which this arrangement will tend to maintain depends on the excitation of the engine driven generator and can therefore be changed by changing the resistance 5 in the circuit of the shunt winding of the engine driven generator. The current through the controller depends in part on the terminal voltage of the engine driven generator, but is in the main dependent on whether the relay is closed, thus shortcircuiting the resistance 9, or whether said relay is open. When the relay is closed, the current through the controller is a maximum, when it is open, this current is a minimum. All intermediate values are secured by more or less rapid vibration of the relay armature 9. It is only when the relay is either open or closed that the current through the controller is directly dependent on the terminal voltage of the engine driven generator. At all other times, this current is modified by the vibration of the relay.

It is also possible to operate the arrangement shown in Fig. 2 in which the throttle valve is normally open by allowing the battery voltage to exceed the generator voltage in normal operation. In such case, it is only necessary to so arrange the vibrator that the resistance 19 is shortcircuited when the armature 9 is in control of the spring. As the speed of the generator increases, the current in the relay circuit will diminish and will finally release the armature 9, thus shortcircuiting the resistance 9, and tending to close the throttle valve and thus reducing the speed of the prime mover. This arrangement of the relay is shown in Fig. 3.

The arrangement shown in Fig. 3 differs from that illustrated in Fig. 2 in that the throttle valve is normally closed being held in that position by means of the spring 15. It further differs from Fig. 2 in that the generator is of the Sayers third brush type, the third brush being so located that the E. M. F. between it and the main brush to which the exciting winding is connected increases with speed and armature current. This arrangement corresponds in most respects to an ordinary compound wound generator. In normal operation, the voltage of the engine driven generator exceeds that of the storage battery 6. The speed of the prime mover is adjusted by changing the resistance in the circuit of the exciting winding 4. This arrangement can also be operated by keeping the generator voltage below that of the storage battery in which case the vibratory relay must be arranged as shown in Fig. 2 and must be normally open. An important advantage of having the generator voltage higher than that of the storage battery is the fact that in all such cases, the battery is being charged in normal operation. This is particularly important in case the battery is used for cranking the engine.

It will be understood that the solenoid 18 in Fig. 1 and the series motor 17, 18 in Figs. 2 and 3 are merely conventional showings of an electromagnetic throttle valve controller. There are a number of forms of such apparatus and anyone of them can be used.

Having fully described my invention, what I claim as new and desire to secure by Letters Patent of the United States is:

1. The combination of a prime mover, speed controlling means therefor, electromagnetic means for actuating the controller, a generator driven by the prime mover, a vibratory relay for automatically varying the current supplied to said electromagnetic means, said vibratory relay being responsive to the current output of the generator and operable when said current output passes a predetermined value.

2. The combination of a prime mover, speed controlling means therefor, electromagnetic means for actuating the controller, a generator driven by the prime mover, a source of E. M. F. independent of the prime mover and connected to oppose the generator E. M. F., and means in the circuit comprising the generator and the independent source of E. M. F. for automatically varying the energy supplied to the electromagnetic means.

3. The combination of an internal combustion engine, a throttle valve therefor, electro-magnetic means for actuating the valve, means tending to hold the valve in closed position, a generator driven by the engine and in circuit with the electro-magnetic means, means for introducing resistance into said circuit, said means comprising a relay in circuit with the generator, and an independent source of E. M. F. in said relay circuit and connected to oppose the generator E. M. F.

In testimony whereof, I have hereunto set my hand and affixed my seal.

VALÈRE A. FYNN. [L. S.]